US008879197B2

(12) United States Patent
Starr (10) Patent No.: US 8,879,197 B2
(45) Date of Patent: Nov. 4, 2014

(54) SELF-DESCRIBING A PREDEFINED POOL OF TAPE CARTRIDGES

(75) Inventor: Matthew Thomas Starr, Lafayette, CO (US)

(73) Assignee: Spectra Logic, Corporation, Boulder, CO (US)

( * ) Notice: Subject to any disclaimer, the term of this patent is extended or adjusted under 35 U.S.C. 154(b) by 338 days.

(21) Appl. No.: 13/356,291

(22) Filed: Jan. 23, 2012

(65) Prior Publication Data

US 2012/0127606 A1 May 24, 2012

Related U.S. Application Data

(63) Continuation-in-part of application No. 10/950,613, filed on Sep. 27, 2004.

(51) Int. Cl.
*G11B 15/68* (2006.01)
*G11B 7/085* (2006.01)

(52) U.S. Cl.
USPC .......................................... 360/92.1; 369/30.4

(58) Field of Classification Search
USPC ........... 360/79, 83, 91, 90, 72.3, 92.1, 93, 95;
711/111, 156, 170; 369/30.04, 30.1,
369/30.2, 30.28, 30.38, 30.4, 30.53, 30.65
See application file for complete search history.

(56) References Cited

U.S. PATENT DOCUMENTS

| 4,979,054 A | 12/1990 | McCullough et al. |
| 5,758,050 A | 5/1998 | Brady et al. |
| 5,764,992 A | 6/1998 | Kullick et al. |
| 6,226,441 B1 | 5/2001 | Hartung et al. |
| 6,289,405 B1 | 9/2001 | Movall et al. |
| 6,418,111 B1 | 7/2002 | Takemura et al. |
| 6,469,978 B1 | 10/2002 | Ohata et al. |
| 6,606,285 B1 | 8/2003 | Ijtsma et al. |
| 6,710,962 B1 | 3/2004 | Caverly et al. |
| 6,724,701 B2 | 4/2004 | Ijtsma et al. |
| 6,753,873 B2 | 6/2004 | Dixon et al. |
| 6,760,288 B2 | 7/2004 | Ijtsma et al. |
| 6,763,458 B1 | 7/2004 | Watanabe et al. |
| 7,103,731 B2 | 9/2006 | Gibble et al. |
| 8,055,839 B2 | 11/2011 | Kishi et al. |
| 8,327,107 B2 * | 12/2012 | Butt et al. ...................... 711/170 |

(Continued)

FOREIGN PATENT DOCUMENTS

WO    WO 2005/010661    2/2005

OTHER PUBLICATIONS

Autodesk, "Discreet Storage Manager Installation and User's Guide—Storage Discreet", Mar. 2004, Autodesk Canada Inc., pp. 1-140.

(Continued)

*Primary Examiner* — Nabil Hindi
(74) *Attorney, Agent, or Firm* — Kenneth Altshuler (57) ABSTRACT

Apparatus and associated method for loading a first tape cartridge into a tape drive, the first tape cartridge formatted to include a user data partition and also to include an index partition, different than and sized smaller than the user data partition, to store an index that self-describes user data designated to the user data partition and to also store non-index data, then reading the non-index data in the index partition of the first tape cartridge to self-describe a second tape cartridge different than the first tape cartridge.

25 Claims, 11 Drawing Sheets

(56) References Cited

U.S. PATENT DOCUMENTS

| | | |
|---|---|---|
| 2004/0103292 A1 | 5/2004 | Shirouzu |
| 2004/0105187 A1 | 6/2004 | Woodruff et al. |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2004/0268037 A1 | 12/2004 | Buchanan et al. |
| 2005/0007692 A1 | 1/2005 | Thompson et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |
| 2006/0294336 A1 | 12/2006 | Gibble et al. |
| 2011/0238716 A1 | 9/2011 | Amir et al. |
| 2011/0238905 A1 | 9/2011 | Amir et al. |
| 2011/0238906 A1 | 9/2011 | Amir et al. |

OTHER PUBLICATIONS

Autodesk, "Discreet Storage Manger Release Notes", Mar. 2004, Autodesk Canada Inc., pp. 1-16.

Microsoft TechNet, "What is Removable Storage?", http://technet2.microsoft.com, pp. 1-4, Mar. 2003.

Trevor Kay, "Server + Certification Bible", 2002, Hungry Minds, Inc., pp. ix-xxviii, 1-546.

\* cited by examiner

SELF-DESCRIBING A PREDEFINED POOL OF TAPE CARTRIDGES

RELATED APPLICATION

This is a continuation-in-part of previously filed U.S. patent application Ser. No. 10/950,613.

FIELD OF THE INVENTION

The present embodiments relate generally to tape libraries and more particularly but without limitation to self-describing a pool of tape cartridges that are related to each other from information obtained directly from a particular tape cartridge that is in the pool.

DESCRIPTION OF RELATED ART

Data storage libraries, such as tape libraries, are typically used to store and retrieve large amounts of data for data manipulation and archiving purposes. These libraries generally have drive devices adapted to write data to and read data from tape cartridges that can be removably housed within the tape libraries.

The tape medium is an illustrative embodiment of an addressable storage medium to which data is stored and from which stored data is retrieved in accordance with embodiments of the claimed invention. An addressable storage medium is "addressable" in that storage locations are demarcated by storage addresses, be they physical addresses (such as physical block addresses, PBAs) or logical addresses (such as logical block addresses, LBAs). A plurality of storage elements each employing a separate addressable storage medium can be combined to form a data storage array. In the illustrative embodiments below a tape medium is described, such as that in an LTO-3 type cartridge which can be provided by TDK Corp. of Tustin, Calif.

Although a tape medium is used for purposes of this description, the claimed embodiments are not so limited such that in equivalent alternative embodiments the addressable storage medium encompasses other types of storage media such as but not limited to magnetic data storage disks, optical data storage disks, solid state memory, and the like.

SUMMARY OF THE INVENTION

In some embodiments a method is provided that loads a first tape cartridge into a tape drive, the first tape cartridge formatted to include a user data partition and also to include an index partition, different than and sized smaller than the user data partition, to store an index that self-describes user data designated to the user data partition and to also store non-index data. The method further reads the non-index data in the index partition of the first tape cartridge to self-describe a second tape cartridge different than the first tape cartridge.

In some embodiments a tape cartridge is provided having a user data partition for user data, and having an index partition, different than and sized smaller than the user data partition, for an index that self-describes the user data designated to the user data partition, and also for a non-index data self-describing a different tape cartridge.

In some embodiments, a data storage library is provided having a frame and a shelf system supported by the frame to queue a plurality of magazines. A tape cartridge is removably supported by one of the plurality of magazines. A drive is adapted to engage the tape cartridge in a data transfer relationship. A transport system, responsive to a data transfer command, selectively moves the tape cartridge between the queue in the shelf and the data transfer relationship in the drive. Computer code stored to the tape cartridge is implemented upon establishing the data transfer relationship and before completing the data transfer command to obtain self-describing information about user data stored on the tape cartridge and to also self-describe one or more other tape cartridges in the data storage library that are for storing data that is related to the data transfer command by a predetermined relationship.

DETAILED DESCRIPTION

Initially, this disclosure is by way of example only, not by limitation. The concepts herein are not limited to use or application with a specific system or method for using storage element devices to form a storage array. Thus, although the instrumentalities described herein are for the convenience of explanation, shown and described with respect to exemplary embodiments, it will be appreciated that the principles herein may be applied equally in other types of storage element systems and associated methods.

Figure 1A:
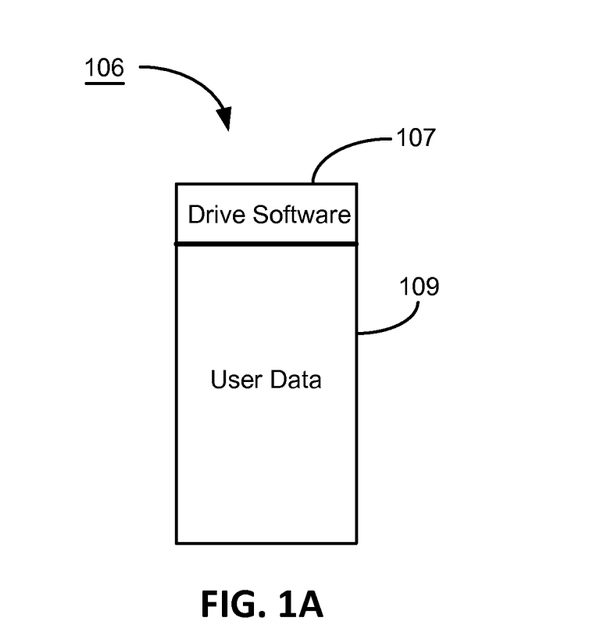
FIG. 1A is a pictorial representation of a mobile readable and writeable media configured in embodiments of the present invention.

Referring to the drawings in general, and more particularly to FIG. 1A, shown therein is a pictorial representation of a mobile readable and writeable media of configuration 106 constructed in accordance with embodiments of the present invention. For purposes of the illustrative embodiments that follow, the media 106 can be a tape cartridge although the contemplated embodiments are not so limited. For example, without limitation, in alternative equivalent embodiments the media 106 can be alternately constructed such as of a floppy disc, removable hard disc, a thumb drive, a compact disc, an optical digital media, a media pack, a flash memory, an SRAM, an MRAM, and any solid state memory and the like, and any combination thereof.

Figure 1B:
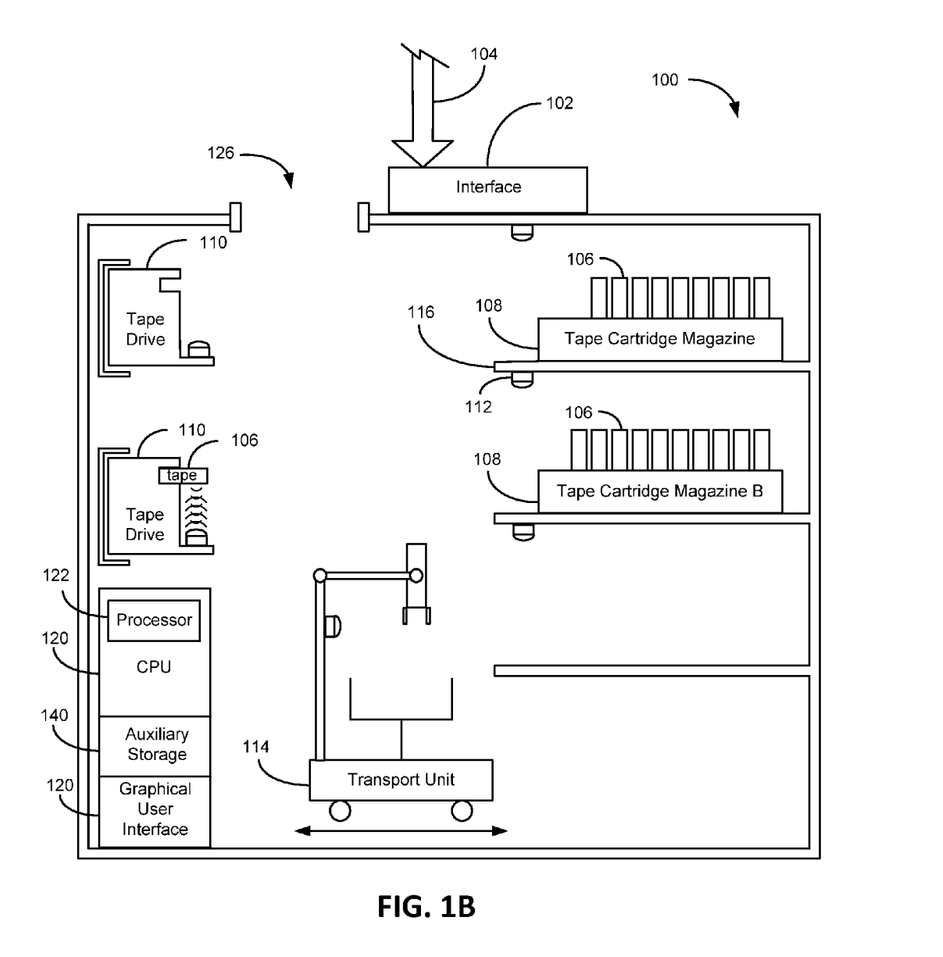
FIG. 1B diagrammatically depicts a tape library system that is constructed in accordance with embodiments of the present invention.

Media 106 is a diagrammatic illustration of a mobile readable and writeable media having data space 107 accessible for use by an end user and having drive device software space 109 allocated for a drive device. FIG. 1B diagrammatically depicts a tape library system 100. External communication for storing data to and retrieving data from the tape library 100 is performed via an interface 102 coupled to a communication link 104. The number and arrangement of the various components depicted in FIG. 1B are merely illustrative and in no way limiting of the claimed invention.

The tape library 100 has a plurality of tape cartridges 106 grouped in magazines 108. Each of the tape cartridges 106 is identifiable by a unique indicia, such as by bar codes, radio frequency identification (RFID) tags, or other semiconductor memory devices and the like, for selectively mounting a desired one of the tape cartridges 106 in the library 100 by placing it in a data transfer relationship with one of a plurality of tape drives 110. The latter types of indicia devices can be used to advantageously write and/or supplement identifying information to the tape cartridge 106, such as access occurrence information or validity information and the like. For clarification sake, the term "tape drive" as used herein means the tape drive data transfer mechanism 110 with a selected tape cartridge 106 operably disposed therein.

A transport unit 114 shuttles magazines 108 between a queue in a shelf storage 116 and the tape drives 110, and picks and places a particular tape cartridge 106 from a shuttled magazine 108 to a desired tape drive 110. Again, although FIG. 1B diagrammatically depicts two magazines 108 of eleven tape cartridges 106 each being shuttled to and from two tape drives 110, that arrangement is merely illustrative and in no way limiting of the claimed embodiments. In any event, a desired number of tape drives 110 can be provided within the library to concurrently access a corresponding number of tape cartridges 106 in a storage element array, or two or more libraries 100 can communicate with each other to form that same storage element array.

The tape library 100 is not necessarily limited to using a fixed number of tape cartridges 106. Rather, an access port 118 is configured to cooperate with an external transport system (not shown) to deliver or remove individual tape cartridges 106 or magazines 108.

Top level control is provided by a central processing unit (CPU) 120 in communication with all the various components via a computer area network (not shown). Data, virtual mappings, executable computer instructions, operating systems, applications, and the like are stored to memory and retrieved for processing by one or more processors 122.

Figure 2:
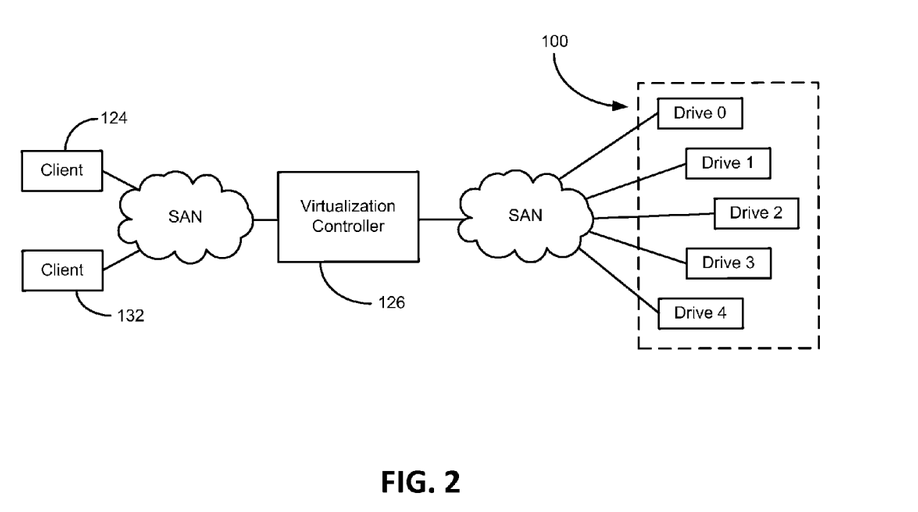
FIG. 2 is a functional block depiction of the tape library system of FIG. 1B operably disposed in a distributed storage system.

FIG. 2 diagrammatically depicts illustrative embodiments of the tape library 100 connected externally to a network to function as a storage element array in a distributed storage system. Each of the remote clients 124 can view the entire physical storage capacity of the tape library 100 (as collectively defined by the tape cartridges 106) as a unified storage space. A virtualization controller 126 is depicted in these illustrative embodiments as a network node that passes user data and storage management information between the tape library 100 and the clients 124 via network links such as, but not necessarily limited to, fibre channel storage area networks (SANs). The virtualization controller 126 also buffers data being transferred between the clients 124 and the tape library 100 to permit optimal tape cartridge 106 utilization and, in turn, data throughput performance.

Figure 3:
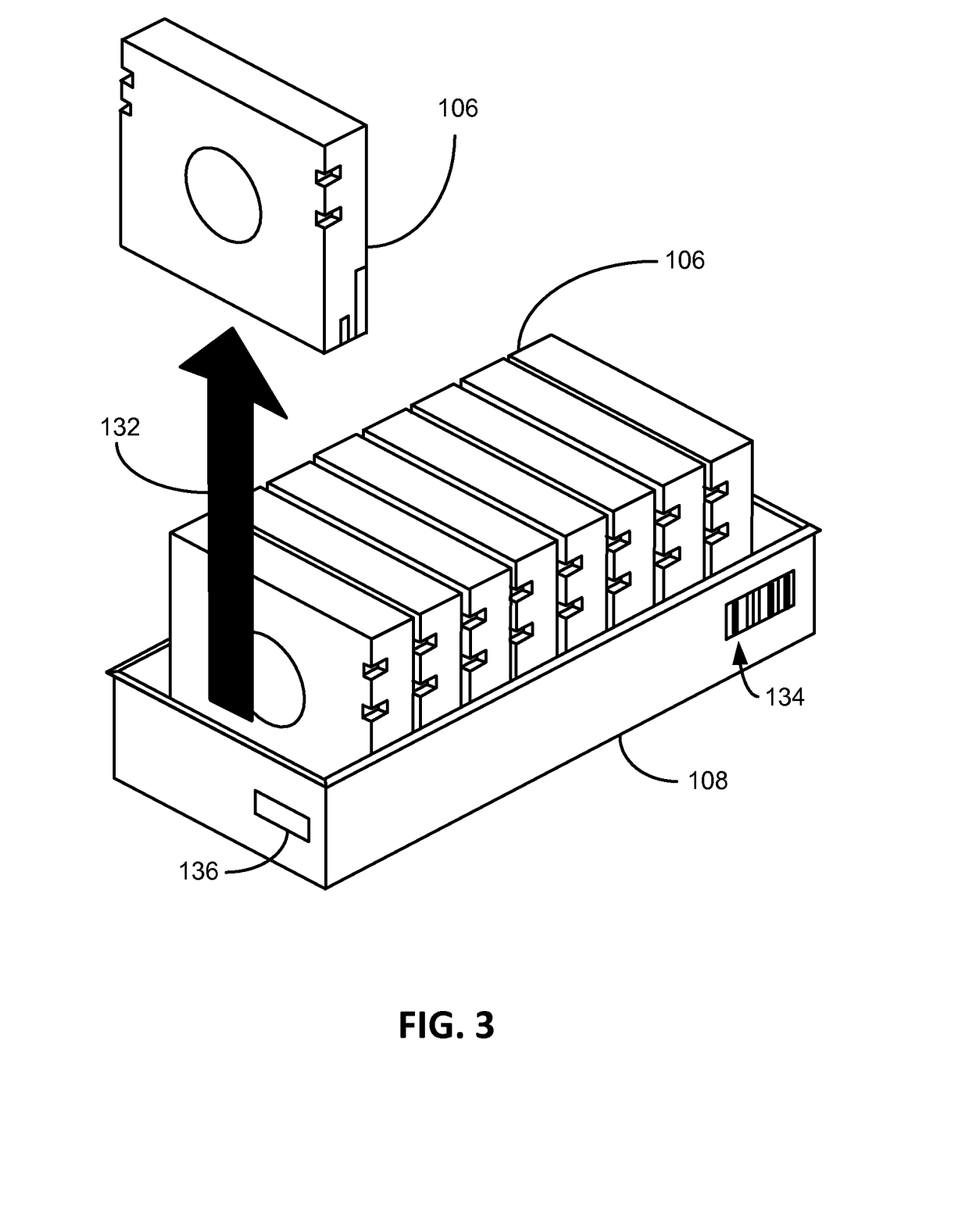
FIG. 3 is an isometric depiction of a magazine of tape cartridges in the tape library system of FIG. 1B.

With reference to FIG. 3, shown therein are tape cartridges 106 supported by a tape cartridge magazine 108. In more detail, a tape cartridge 106, such as an LTO-3 category tape cartridge manufactured by IBM, of Armonk, N.Y., comprises magnetic tape that is capable of storing digital data written by a compatible drive 110, such as an LTO-3 tape drive manufactured by IBM, when mounted in the library 100 (loaded in the tape drive 110). The magazine 108 is shown populated with a plurality of tape cartridges 106. A tape cartridge 106 can be removed from the magazine 108, as shown by the arrow 132, and inserted into the tape drive 110 by means of a picker device (not shown).

Each magazine 108 is readily identifiable by an indicia reading device, such as by the bar code identifier 134 in these depicted embodiments. In equivalent alternative embodiments the magazine 108 is readily identifiable by other types of electronic transceiver indicia devices 136 such as but not limited to a radio frequency identification (RFID) system or some other type of a magazine auxiliary memory (MAM) device. In those latter embodiments the electronic indicia device can advantageously continually update information received from compatible electronic indicia devices in (or on) each tape cartridge 106.

Information between these electronic indicia devices, on the tape cartridge 106 or on the magazine 108 or on both, can be read from one of them and immediately transmitted to the other. In illustrative embodiments, the electronic indicia device can retain access occurrence information of every tape cartridge 106 associated with the magazine 108, for the purposes of providing self-describing rules used in filtering data as discussed below.

An electronic indicia device, in some embodiments, is an auxiliary radio frequency memory device, which is parceled into three regions in which data can be stored; a medium device region which contains information such as a serial number, a device region which contains information from the tape drive 110 such as load count and access occurrence, and a host/vendor unique region wherein information such as history and/or performance data related to the cartridge 106 can be stored. New information in the regions can be added via an address related to the arrangement of available storage space in the electronic indicia device or, optionally, the information can be read by an auxiliary memory reader and reassembled with additional information and stored back to the electronic indicia device. If a storage limit is reached in the electronic indicia device, the data can be moved to an auxiliary storage space, such as the auxiliary memory 140 (FIG. 1B), and the electronic indicia device then purged and made available for new information.

Figure 4:
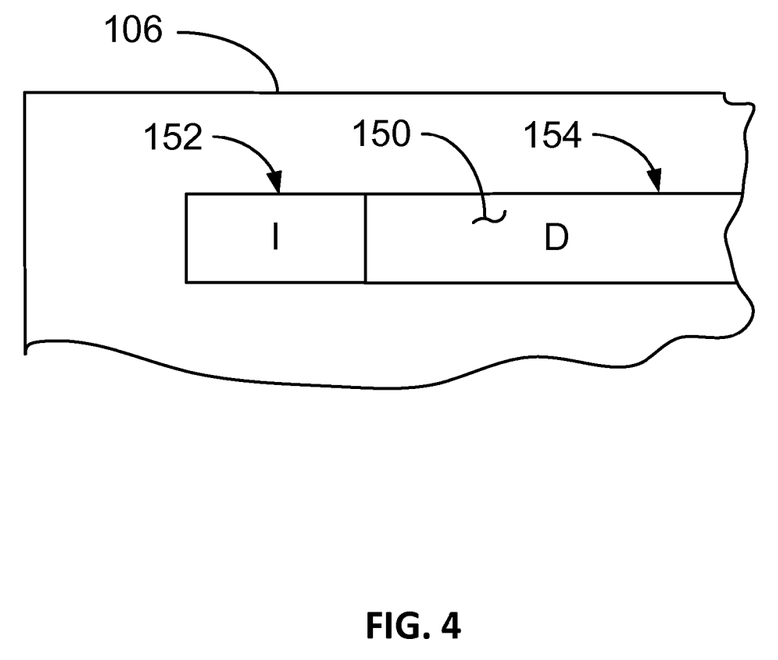
FIG. 4 diagrammatically depicts the dual partitioned tape medium in the tape cartridges in the tape library system of FIG. 1B.

Partitioning of the data storage space defined by the tape cartridge 106 can be done in various different ways. Only for purposes of describing illustrative embodiments of the claimed invention, FIG. 4 depicts the tape storage medium 150 in the tape cartridge 106 being partitioned into two completely separate segments, or in other words partitions, 152, 154 that in these illustrative embodiments correspond to the data spaces 107, 109, respectively (FIG. 1A). The partitions 152, 154 depict a lateral partition that entirely spans the tape medium 150 laterally, meaning each partition 152, 154 includes both the minimum and maximum number of wraps as the linear tape is operably coiled and uncoiled around a tape hub. Alternatively, although not depicted, a longitudinal partition can be provided by designating one or more wraps to one partition and the rest of the wraps to the other partition or partitions. In any event, each partition is identified and addressed separately from the existence of any other data or other partition(s) on the tape storage medium 150. Again, although the illustrative embodiments depicted by FIG. 4 (and the present written description) describe two partitions, this is by way of example, accordingly the claimed embodiments are not so limited in that the skilled artisan will appreciate that in equivalent alternative embodiments the same can be said for three or more partitions. Also, importantly, although the illustrative embodiments depicted by FIG. 4 (and the present written description) describe both partitions existing on the tape storage medium 150, the claimed embodiments are not so limited in that the skilled artisan appreciates that in alternative equivalent embodiments, one or all of the partitions, preferably the index partition discussed below, can be formed in the corresponding electronic indicia device either on the tape cartridge 106 or on the magazine 108.

FIG. 4 depicts illustrative embodiments of a dual-partition storage space whereby the tape storage medium 150 is formatted to include two partitions, the first being an index partition 152 and the second being a user data partition 154. A corresponding label block (not shown) is typically written at the start of each respective partition to identify it as such. The index partition 152 contains an index of any directories formatted to the user data partition 154 as well as any data files designated to the user data partition 154. For purposes of this description and meaning of the appended claims, "designated to" includes both data that is presently stored to (or retained in) the user partition 154 as well as data that is directed to be stored to the user data partition 154 by way of a pending write command.

The index in the index partition 152 is continually updated to reflect the addition of data to and the removal of data from the user data partition 154. It can be advantageous for data reliability sake to maintain a redundant copy of the index, either in one of the partitions 152, 154 or in its own dedicated partition. For example, without limitation, the redundant index can be maintained at the old state pending and during the time that the primary index is rewritten, so that in the event of a data transfer error or interruption the library 100 can roll back to the previous state as defined by the redundant index to facilitate a quicker, more robust recovery from such an event in comparison to reconstructing the old state or remotely retrieving the old state information.

Figure 5:
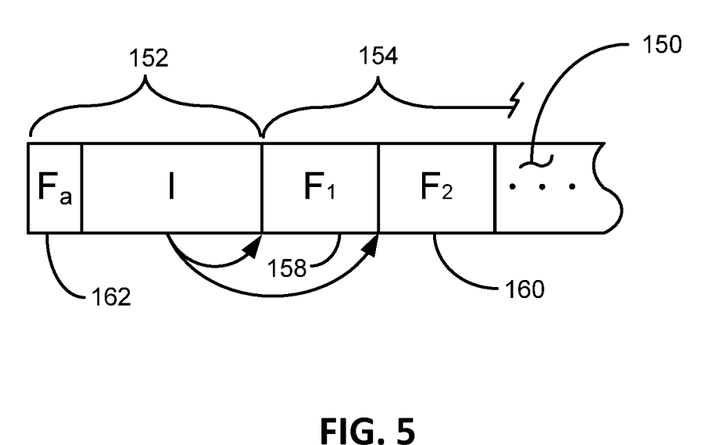
FIG. 5 diagrammatically depicts the dual partitioned tape medium of FIG. 4 but more particularly depicting non-index data in the index partition.

FIG. 5 illustratively depicts an index in the index partition 152 self-describing user data files $F_1$ 158 and $F_2$ 160. The skilled artisan appreciates that although the user data files $F_1$, $F_2$ are literally depicted as being sequentially stored in the user data partition 154, the user data files $F_1$, $F_2$ can alternatively be physically stored non-sequentially. Furthermore, the index is likely logically rearranged as the user data files are updated, while some or all of the corresponding data remains physically in the same location on the storage tape storage medium 150.

In these embodiments another non-index data portion $F_a$ 162 is stored in the index partition 152. Although storing non-index data, such as this on the index partition 152, might appreciably increase the time necessary to access the index when the tape cartridge 106 is loaded into the drive 110, there are certain situations and certain types of non-index data for which doing so is advantageous. Preferably, any such non-index data are relatively small to minimize the loading delay associated with them, but small metadata files can advantageously contain information about much larger files stored elsewhere, such as on the corresponding user data partition(s) on the same tape cartridge or, as in the present embodiments, such as on user data partitions located on another one or more tape cartridges 106.

Metadata files like this can support data applications to find and/or manipulate specific content within large user data files without the need to read the large user data file in its entirety. Metadata files like this can likewise trigger library operations to identify a predetermined pool of the tape cartridges 106 that collectively contain a physical storage volume to which a logical volume of concern is mapped. It can be advantageous to keep such non-index data in the index partition 152 for tracking file attributes such as the file name, file size, file type, date of creation, date of last modification and other dates, access permission information, checksum of the file content, owner, and the like. The non-index data might otherwise include information such as a mode number, a sequential number where concatenation is used to combine files, or a file ID. The non-index data might otherwise contain an encryption key used to encrypt or decrypt the file data.

The operations conducted by these non-index metadata in the index partition 152 can effectively be exploited by continually writing and deleting them as flag data instead of continually adding new metadata, to keep their size and imposition to a minimum with regard to the underlying purpose of the index in the index partition 152. Furthermore, the handling of the non-index data in the index partition 152 and the library functions, which they can trigger, can be performed independently of, and without any adverse effect whatsoever on, the user data files designated to the user data partition 154.

Although the illustrative embodiments of FIG. 5 depict only one such metadata file $F_a$ 162, the claimed embodiments are not so limited in that the skilled artisan appreciates that the same can be said for a plurality of such metadata without the need for further elaboration. In any event, when the tape cartridge 106 is loaded to one of the tape drives 110, or in other words at tape mount time, the index and the non-index files stored on the index partition 152 are first and quickly read.

An important advantage of the present embodiments is a rapid and self-describing response following access to information gained from non-index data stored in the index partition 152. Particularly, in these embodiments self-describing pool logic is advantageously applied when a correspondence is indicated between data being transferred to/from a tape cartridge 106 and the predetermined knowledge that other tape cartridges 106 in a predetermined pool likely contain data that is related to that data transfer activity. The predetermined pool (of related tape cartridges) may reside in a magazine 108, or in a location in the tape library 100 wherein the tape cartridges 106 that comprise the pool are near one another. Examples of a pool of tape cartridges 106 being nearby one another include the pool being on the same shelf, all tape cartridges 106 from the pool being next to one another, most tape cartridges 106 from the pool being next to one another, the tape cartridges 106 from the pool being efficiently accessible by one or more transport units 114, etc. Related tape cartridges may be a pool of tape cartridges that have common or related user data retained therein, from a common user of data, from a specific date or time period, about a common subject matter, just to name several examples.

Figure 6:
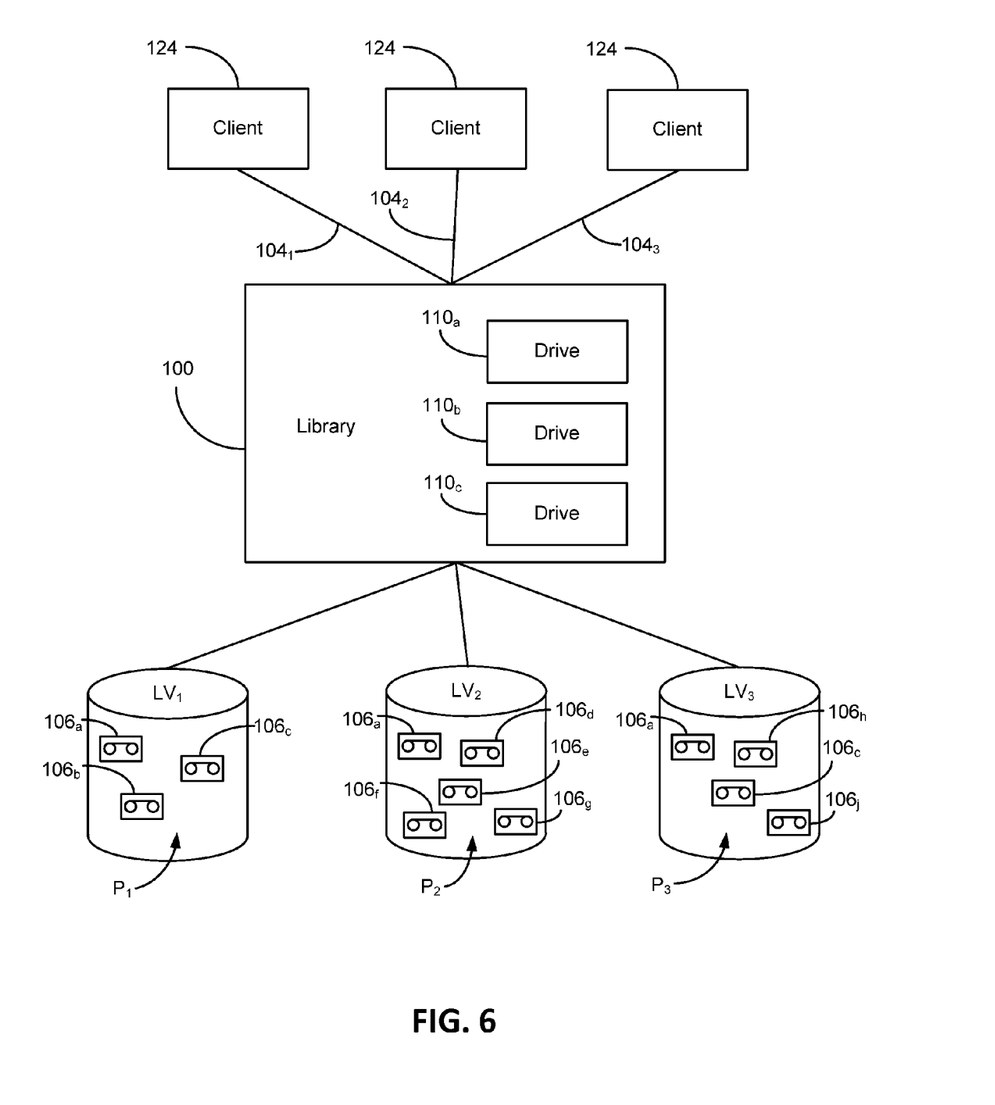
FIG. 6 is a functional block depiction similar to FIG. 2 but more particularly depicting predetermined pools of tape cartridges defining physical volumes to which corresponding logical volumes are mapped.

FIG. 6 diagrammatically depicts the tape library 100 (FIG. 1B) by which each of a plurality of the clients 124 (FIG. 2) perform data transfer transactions, storing data to and retrieving previously stored data from, each of a plurality of tape cartridges 106. Three predetermined pools $P_1$, $P_2$, $P_3$ of the tape cartridges 106 are defined by the library 100. For the useful purpose of an illustrative description, not limiting of the claimed subject matter, the predetermined pools $P_1, P_2, P_3$ can be determinative as to which of the storage cartridges 106 contain data that has been allocated to a particular logical storage volume $LV_1, LV_2, LV_3$, respectively. For example, in the embodiments depicted by FIG. 6, each of the storage cartridges $106_a, 106_b, 106_c$ contain physical storage space to which $LV_1$ has been mapped. Each of the pools $P_1, P_2, P_3$ illustrates the fact that a logical volume can be mapped across multiple tape cartridges 106. The skilled artisan also appreciates that multiple logical volumes can be mapped to the same storage cartridge 106, as is depicted by storage cartridge $106_a$ being included in all three of the pools $P_1, P_2, P_3$.

Some situations make it more likely that transferring data with one of the tape cartridges 106 in a pool likely results in also transferring data with the other tape cartridges 106 in the same pool. Where data is of a concatenated distribution, for example, it is not uncommon that the library 100 will need to access each of the tape cartridges 106 in a particular pool in order to process a data transfer operation. Identifying the other tape cartridges 106 in the present self-describing manner is advantageous in comparison to doing so under the top level control of the library processor 122. Not only does the present self-describing solution reduce the top level processor 122 I/O load, thus improving data throughput capacity, but the self-describing solution of these embodiments is also comparatively more robust by not being entirely dependent on a central repository of all knowledge defining the present state of the pertinent pool of tape cartridges 106. Updates of the pool information, as tape cartridges 106 are added to or subtracted from a particular pool P, can be made incrementally when any particular tape cartridge 106 is loaded in the drive 110, by amending the non-index data in the index partition 152 (FIG. 5). Of course, it is prudent to maintain a system-wide picture of the present pool status, and such a library index can easily be maintained as the pertinent information from the non-index data is continually provided to the library processor 122. That is, each time a tape cartridge 106 is mounted and the non-index data is read, that status can routinely be provided to the system processor 122 on a low priority cache basis that does not adversely affect the critical path data throughput I/Os.

Figure 7:
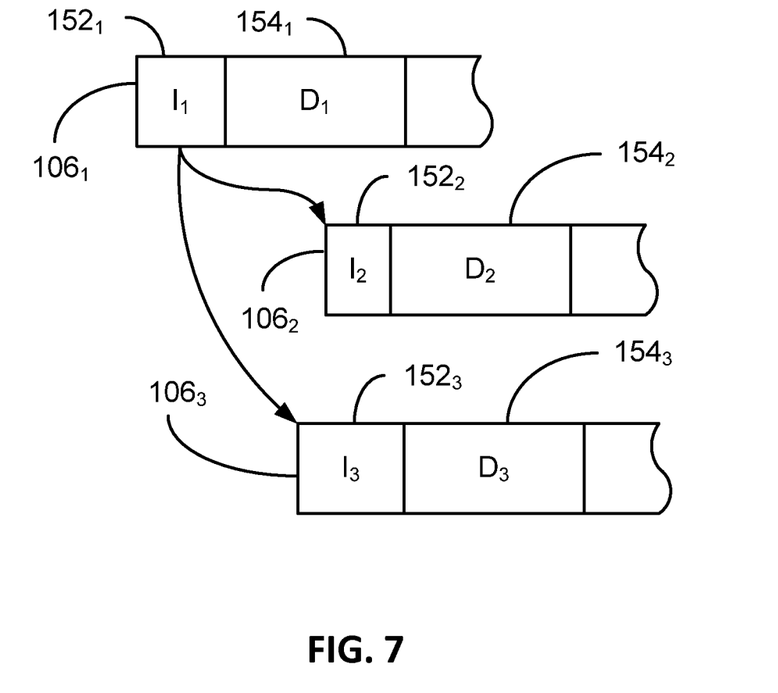
FIG. 7 diagrammatically depicts a pool of three tape cartridges whereby non-index data in the index partition of the first tape cartridge self-describes the other two tape cartridges in the predetermined pool.

FIG. 7 diagrammatically depicts a pool of tape cartridges 106, constructed in accordance with embodiments of the present information in that each has a dual-partitioned tape storage medium including a user data partition 154 for user data and an index partition 152, different than and sized smaller than the user data partition 154, for an index that self-describes the user data designated to the user data partition 154, and can also be for a non-index data identifying a different tape cartridge 106. For example, the non-index data in the index partition 152$_1$ can define a unique indicia corresponding to the different tape cartridge 106$_2$. Generally, the non-index data in the index partition 152$_1$ identifies the second tape cartridge 106$_2$ as being for data that is related to the user data in the user data partition 154$_1$ of the first tape cartridge 106$_1$. Particularly, the non-index data in the index partition 152$_1$ identifies the second tape cartridge 106$_2$ for the reason that the user data in the user data partition 154$_2$ is related to the user data in the user data partition 154$_1$ by a predetermined relationship. For example, without limitation, the predetermined relationship can be that at least some of the user data in the user data partition 154$_2$ of the second tape cartridge 106$_2$ is allocated to the same logical volume as at least some of the user data in the user data partition 154$_1$ of the first tape cartridge 106$_1$. This self-describing identification thereby defines an extent to which the physical volume exists to which data is allocated for a particular logical volume associated with a transfer of data with the user data partition 154$_1$ of the first tape cartridge 106$_1$. That is, in response to a data transfer activity to the user data partition 154$_1$ associated with a particular logical volume, the non-index data in the index partition 152$_1$ self-describes at least to some extent the predetermined pool of tape cartridges 106 to which that particular logical volume is presently mapped.

Note that in the embodiments depicted by FIG. 7, the non-index data in the index partition 152$_1$ of the first tape cartridge 106$_1$ identifies both the second tape cartridge 106$_2$ and a third tape cartridge 106$_3$ as being in the pertinent predetermined pool of tape cartridges 106. The depiction of there being three tape cartridges in the pool is entirely illustrative of these embodiments, in that in alternative equivalent embodiments the non-index data in the index partition 152$_1$ can identify any number of other tape cartridges 106. The tape drive 110, by executing computer instructions stored in memory, responds to reading the non-index data in the index partition 152$_1$ at the time the first tape cartridge 106$_1$ is mounted to issue command calls that the second and third tape cartridges 106$_2$, 106$_3$ be loaded to an available tape drive 110 in anticipation of the need to transfer data therewith.

Figure 8:
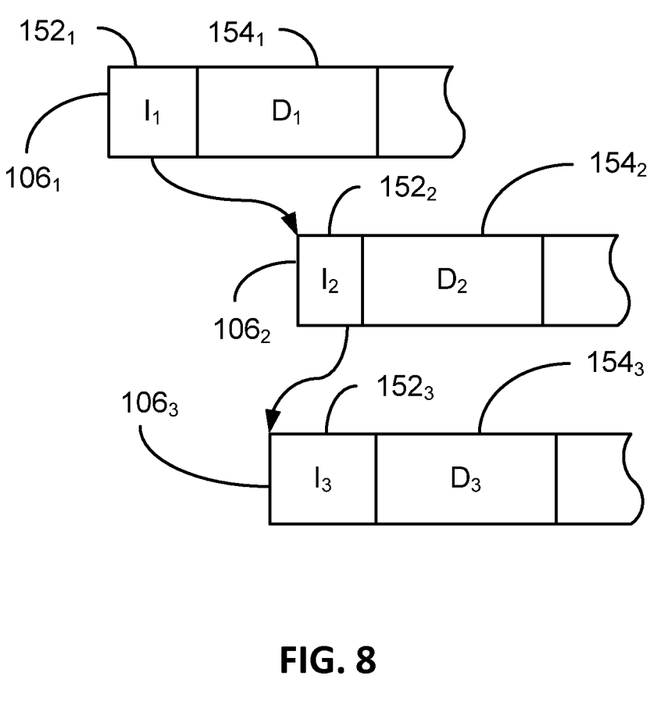
FIG. 8 diagrammatically depicts a pool of three tape cartridges whereby non-index data in the index partition of the first tape cartridge self describes the second tape cartridge which, in turn, has non-index data in the index partition of the second tape cartridge that self-describes the third tape cartridge.

FIG. 8 depicts alternative equivalent embodiments whereby the non-index data in the index partition 152$_1$ of the first tape cartridge 106$_1$ identifies only the second tape cartridge 106$_2$ as being in the predetermined pool of tape cartridges. When the second tape cartridge 106$_2$ is mounted, its non-index data in the index partition 152$_2$ identifies the third tape cartridge 106$_3$ as also being in the pertinent predetermined pool of tape cartridges 106. Again, the depiction of there being three tape cartridges in the pool is entirely illustrative of these embodiments, in that in alternative equivalent embodiments the non-index data in the index partitions 152$_i$ can identify any number of other tape cartridges 106.

Various forms and combinations of metadata about the user data being transferred to any particular tape cartridge 106$_1$ can be advantageously used to minimize the risk that the self-describing manner of identifying the pertinent physical volume according to these embodiments might result in a needless loading one of the tape cartridges 106 in the pertinent predetermined pool but nonetheless not needed in that data transfer event. Sequentiality of the data block transfer, concatenation distribution designs, proximity of the data blocks transferred with the storage tape 106$_1$ to those of the other tape cartridges 106 identified by the non-index data, recentness of accessing the data identified by the non-index data, are but a few illustrative examples of the types of data filtering that can be applied and continually adjusted to minimize any risk that the self-describing manner of retrieving the pertinent physical volume associated with a data transfer event to one or some of the tape cartridges 106 in the pool does not become over-inclusive.

Figure 9:
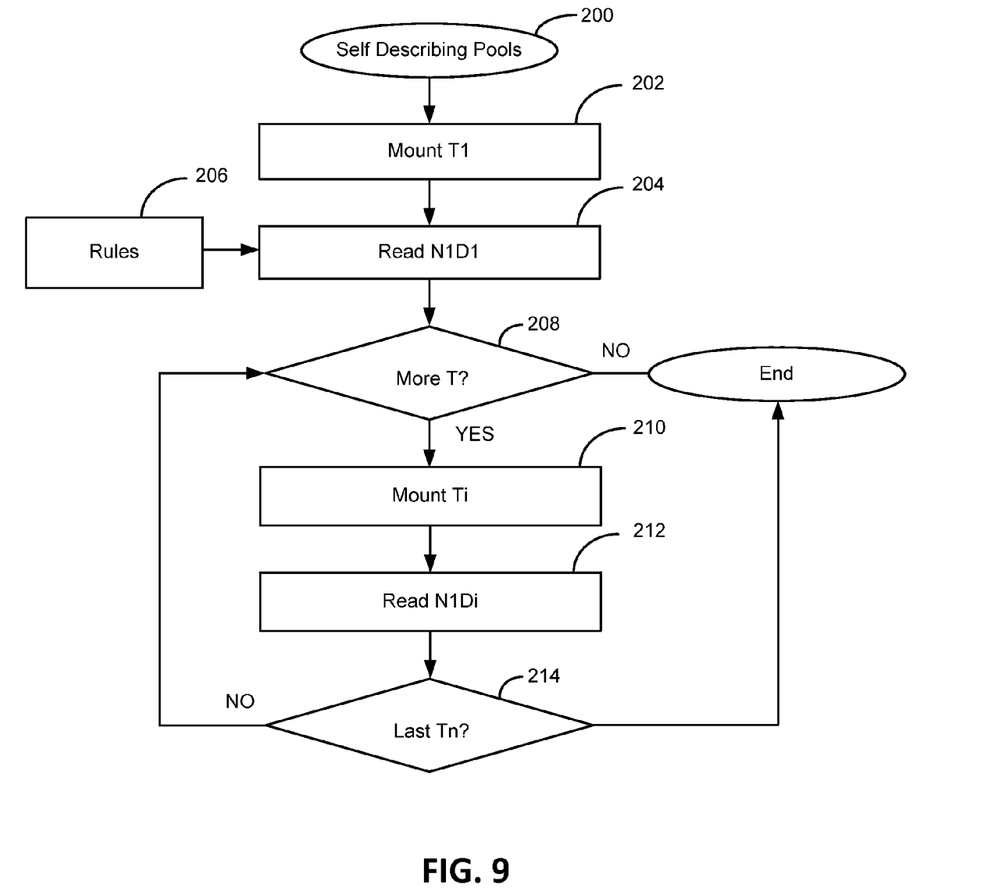
FIG. 9 is a flowchart depicting steps in a method for SELF-DESCRIBING A PREDEFINED POOL OF TAPE CARTRIDGES in accordance with embodiments of the present invention.

FIG. 9 is a flowchart depicting steps in a method 200 for SELF-DESCRIBING A PREDEFINED POOL OF TAPE CARTRIDGES in accordance with certain embodiments of the present invention. The method 200 begins in block 202 with mounting a first tape cartridge $T_1$ in response to a data transfer command from the tape library 100. In block 202 the non-index data "NID" is read from $T_1$, block 204. The $NID_1$ can be advantageously filtered by rules from block 206, such as metadata describing concatenation distribution designs, sequentiality factors, proximity, access recentness, and the like. In block 208 the determination is made, based on the $NID_1$ as appropriately filtered by the rules 206, as to whether one or more other tape cartridge(s) should be mounted in correspondence to the data transfer activity with $T_1$. If the determination of block 208 is "yes," then another one of the identified tape cartridges in the pertinent pool is mounted, block 210. The $NID_i$ is read in block 212, which combined with the result of the previous reading of the $NID_1$ in block 204 is determinative in block 214 as to whether the last tape cartridge $T_n$ in the pertinent pool has been identified. If the determination of block 214 is "no," then control returns to block 210 where the next tape cartridge $T_i$ is mounted and the method continues as described before.

Figure 10:
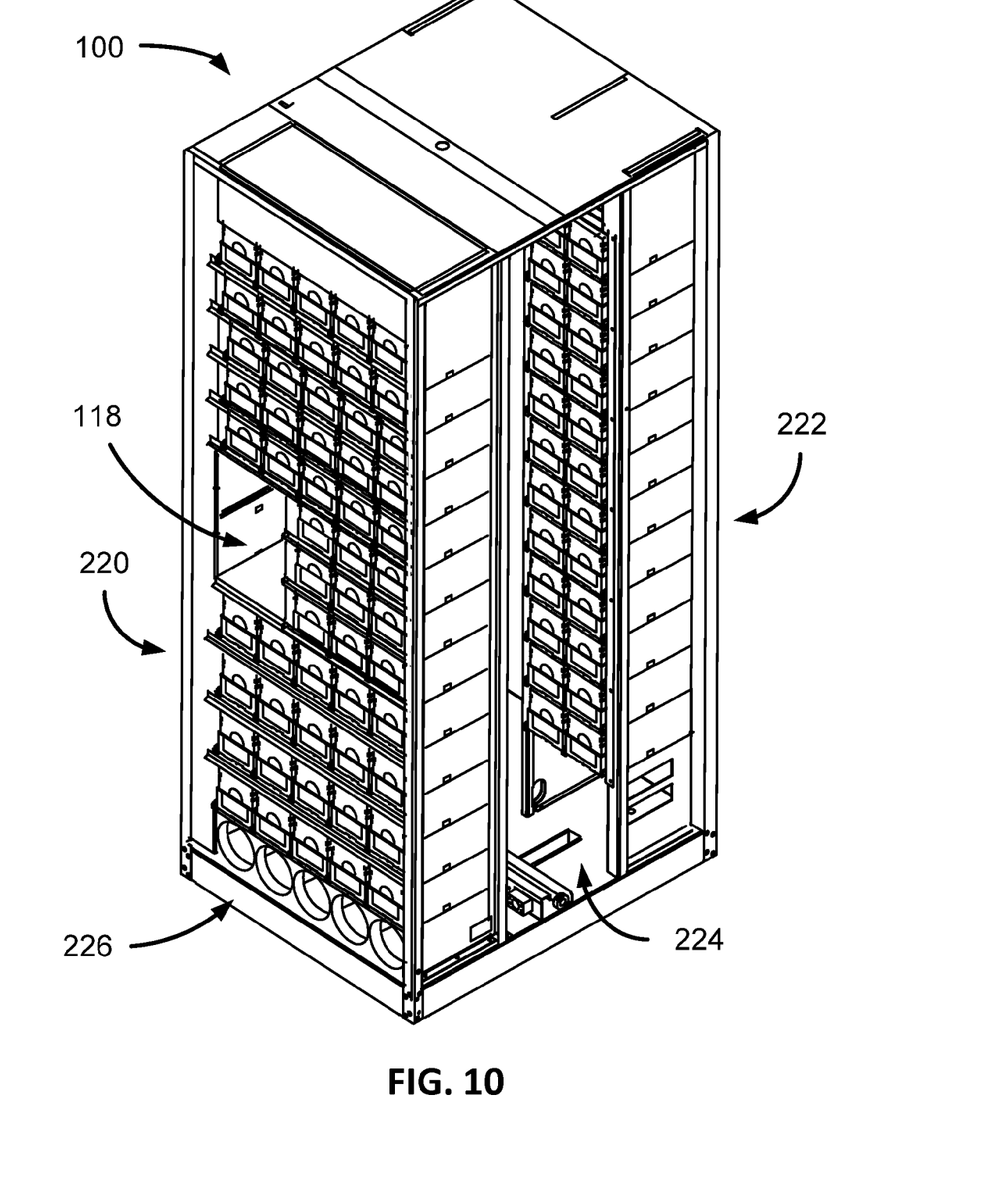
FIG. 10 is an isometric depiction of illustrative commercial embodiments of the tape library system of FIG. 1B.

Embodiments of the present invention can be commercially practiced in a Spectra Logic T-950 tape cartridge library manufactured by Spectra Logic of Boulder Colo. FIG. 10 shows a commercial embodiment of the T-950 library unit 100 without an enclosure. The T-950 library 100 comprises a first and second shelf system 220, 222 that are adapted to support a plurality of the mobile media, such as the magazine holding a plurality of LTO-3 tape cartridges with electronic indicia devices, such as MAMs, archived by the library 100. The shelf systems 220, 222 can each have at least one auxiliary memory reader. Disposed next to the second shelf system 222 are at least four IBM LTO-3 tape drives adapted to write data to and read data from a tape cartridge. The IBM LTO-3 tape drives each have the capability of storing data to an electronic indicia device contained in an LTO-3 tape cartridge. Functionally interposed between the first and second shelf system 220, 222 is a magazine transport space 224. The magazine transport space 224 is adapted to provide adequate space for a magazine to be moved, via the transport unit, from a position in the first shelf system 222, for example, to a tape drive. The transport unit can further accommodate at least one electronic indicia device reader. Magazines can be transferred into and out from the T-950 library 100 via the entry/exit port 118. Transferring magazines in and out of the T-950 library 100 can be accomplished by an operator for example. The T-950 library 100 comprises a means for cooling as shown by the fans 226, located at the base of the library 100. The T-950 library 100 can be linked to a central data base, providing control in storage of all of the auxiliary radio frequency memory devices contained in each tape cartridge in the T-950 library 100 as read by any one of the auxiliary radio frequency memory device readers. The T-950 library 100 also comprises a library controller that can function as the processor device in addition to an auxiliary storage device, such as a disk drive (or plurality of disk drives). The T-950 library 100 also provides a graphical user interface whereon a display of assessment results or, in alternative embodiments, simple messages can be displayed pertaining to a user-specified action associated with a tape cartridge such as an alert accompanying a sound alarm or recommendations for further action/s, for example.

Generally, these described embodiments contemplate such a data storage library 100 having a central structural framework supporting a shelf system to queue a plurality of magazines, with each of a plurality of tape cartridges being removably supported by one of the plurality of magazines. A drive is adapted to engage a selected one of the tape cartridges in a data transfer relationship. A transport system, responsive to a data transfer command, selectively moves the tape cartridge between the queue in the shelf and the data transfer relationship in the drive. Computer instructions stored to the tape cartridge are then executed upon establishing the data transfer relationship and before completing the data transfer command to obtain self-describing information about user data stored on the tape cartridge and to also identify one or more other tape cartridges in the data storage library that are for storing data that is related to the data transfer command by a predetermined relationship. In some illustrative embodiments, for example, the computer instructions, responsive to identifying the one or more other tape cartridges, initiates another data transfer command to the transport system to move at least one of the one or more other tape cartridges to another available drive of the plurality of drives.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple sub-pools within each predetermined pool of tape cartridges can be defined, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between a client and the library, such as the library 100, communication can be received directly by a tape drive, via the interface device, for example, without departing from the scope and spirit of the claimed invention. Further, for purposes of illustration, a first and second tape drive and tape cartridges are used herein to simplify the description for any number of a plurality of drives and tape cartridges that can be employed in equivalent alternative embodiments. Finally, although the preferred embodiments described herein are directed to tape drive systems, and related technology, it will be appreciated by those skilled in the art that the claimed invention can be applied to other systems, without departing from the spirit and scope of the present invention.

It will be clear that the claimed invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed invention disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method comprising:
    in a data storage library, loading a first tape cartridge into a tape drive, the first tape cartridge formatted to include a user data partition and also to include an index partition, different than and sized smaller than the user data partition, to store an index that self-describes user data designated to the user data partition and to also store non-index data; and
    reading the non-index data in the index partition of the first tape cartridge to self-describe a second tape cartridge different than the first tape cartridge.

2. The method of claim 1 wherein the loading feature is characterized by the tape drive being included in the data storage library.

3. The method of claim 1 wherein the tape drive includes a tape storage medium, and wherein the reading feature is characterized by reading the non-index data from the tape storage medium.

4. The method of claim 1 wherein the reading feature comprises identifying a unique indicia corresponding to the second tape cartridge.

5. The method of claim 1 wherein the user data is characterized as a first user data, and wherein the reading feature comprises identifying the second tape cartridge in relation to second user data designated to the second tape cartridge and that is related to the first user data.

6. The method of claim 5 wherein the user data partition is characterized as a first user data partition and the second tape cartridge is formatted to include a second user data partition, wherein the reading feature comprises identifying a predetermined relationship existing between at least a portion of the second user data designated to the second user data partition of the second tape cartridge and at least a portion of the first user data designated to the first user data partition of the first tape cartridge.

7. The method of claim 6 operating in a system having a predetermined pool of a plurality of tape cartridges, wherein the reading feature identifies the first and second tape cartridges as being in the pool of tape cartridges on a basis of the predetermined relationship between at least a portion of the first user data and at least a portion of the second user data.

8. The method of claim 7 wherein the loading feature is responsive to a data transfer command, and wherein the predetermined pool of tape cartridges contains a physical storage volume to which a logical volume corresponding to the data transfer command is mapped.

9. The method of claim 7 wherein the reading feature identifies a third tape cartridge, different than the first and second tape cartridges, as being in the pool of tape cartridges.

10. The method of claim 9, wherein the tape drive is characterized as a first tape drive of a plurality of tape drives, further comprising, as a result of the reading feature, loading at least one of the second and third tape cartridges into an available tape drive of the plurality of tape drives.

11. The method of claim 6 wherein the index partition is characterized as a first index partition, the non-index data is characterized as a first non-index data, and the second tape cartridge is formatted to include a second index partition, different than and sized smaller than the second user data partition, to store a second index self-describing the second user data and to also store a second non-index data, further comprising reading the second non-index data to identify a third tape cartridge, different than the first and second tape cartridges, as being in the pool of tape cartridges.

12. A tape cartridge disposed in a data storage library, the tape cartridge comprising:
a user data partition for user data; and
an index partition, different than and sized smaller than the user data partition, for an index that self-describes the user data designated to the user data partition, and also for a non-index data self-describing a different tape cartridge.

13. The tape cartridge of claim 12 including a tape storage medium, wherein the index is stored on the tape storage medium.

14. The tape cartridge of claim 12 wherein the non-index data comprises a unique indicia corresponding to the different tape cartridge.

15. The tape cartridge of claim 12 characterized as a first tape cartridge and the different tape cartridge characterized as a second tape cartridge, wherein the non-index data identifies the second tape cartridge as being for data that is related to the user data.

16. The tape cartridge of claim 15 wherein the user data partition is characterized as a first user data partition and the user data is characterized as a first user data, the second tape cartridge being formatted to include a second user data partition for second user data that is related to the first user data by a predetermined relationship.

17. The tape cartridge of claim 16 characterized by a predetermined pool of a plurality of tape cartridges, wherein the non-index data identifies the first and second tape cartridges as being in the pool of tape cartridges on a basis of the predetermined relationship between at least a portion of the first user data and at least a portion of the second user data.

18. The tape cartridge of claim 17 wherein the non-index data identifies a third tape cartridge, different than the first and second tape cartridges, as being in the predetermined pool of tape cartridges.

19. The tape cartridge of claim 17 wherein the index partition is characterized as a first index partition, the non-index data in the first index partition is characterized as a first non-index data, and the second tape cartridge includes a second index partition, different than and smaller than the second user data partition, the second tape cartridge further comprising a second non-index data stored in the second index partition that identifies a third tape cartridge, different than the first and second tape cartridges, as being in the predetermined pool of tape cartridges.

20. A data storage library comprising:
a frame;
a shelf system supported by the frame to queue a plurality of magazines;
a tape cartridge removably supported by one of the plurality of magazines;
a drive adapted to engage the tape cartridge in a data transfer relationship;
a transport system, responsive to a data transfer command, selectively moving the tape cartridge between the queue in the shelf and the data transfer relationship in the drive; and
computer code stored to the tape cartridge that is implemented upon establishing the data transfer relationship and before completing the data transfer command to obtain self-describing information about user data stored on the tape cartridge and to also self-describe one or more other tape cartridges in the data storage library that are for storing data that is related to the data transfer command by a predetermined relationship.

21. The data storage library of claim 20 having a plurality of drives, wherein the computer instructions, responsive to identifying the one or more other tape cartridges, initiates another data transfer command to the transport system to move at least one of the one or more other tape cartridges to an available drive of the plurality of drives.

22. The data storage library of claim 21 wherein the tape cartridge includes a tape storage medium, wherein the computer instructions retrieve an index stored on the tape storage medium that identifies at least one of the one or more other tape cartridges.

23. A data storage library comprising:
a frame;
a shelf system supported by the frame to queue a related group of tape cartridges;
a drive adapted to engage the tape cartridges in a data transfer relationship;

a transport system, responsive to a data transfer command, selectively moving one of the tape cartridges between the queue in the shelf and the data transfer relationship in the drive; and computer code stored to a first tape cartridge from the related group of tape cartridges that is implemented upon establishing the data transfer relationship and before completing the data transfer command to obtain self-describing information about user data stored on the first tape cartridge and to also self-describe one or more other tape cartridges from the related group of tape cartridges in the data storage library that are for storing data that is related to the data transfer command by a predetermined relationship.

24. The data storage library of claim 23 wherein said related group of tape cartridges are disposed near one another in said shelf system.

25. The data storage library of claim 23 wherein said related group of tape cartridges are disposed in a common magazine.

* * * * *